United States Patent
Liang et al.

(10) Patent No.: US 9,372,514 B2
(45) Date of Patent: Jun. 21, 2016

(54) APPARATUS FOR FASTENING EXPANSION CARD

(71) Applicant: Huawei Technologies Co., Ltd., Shenzhen, Guangdong (CN)

(72) Inventors: Xufei Liang, Shenzhen (CN); Yinzhong Tang, Shenzhen (CN); Bo Wang, Shenzhen (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 14/297,376

(22) Filed: Jun. 5, 2014

(65) Prior Publication Data

US 2014/0301038 A1   Oct. 9, 2014

Related U.S. Application Data

(63) Continuation of application No. PCT/CN2012/083758, filed on Dec. 3, 2012.

(30) Foreign Application Priority Data

Mar. 21, 2012  (CN) .......................... 2012 1 0075657

(51) Int. Cl.
*H05K 5/00* (2006.01)
*G06F 1/18* (2006.01)

(52) U.S. Cl.
CPC ................ *G06F 1/186* (2013.01); *G06F 1/185* (2013.01)

(58) Field of Classification Search
CPC .......... G06F 1/186; G06F 1/185; G06F 1/181
See application file for complete search history.

(56) References Cited

U.S. PATENT DOCUMENTS

| | | | | |
|---|---|---|---|---|
| 6,671,181 | B2 * | 12/2003 | Kaminski | G06F 1/184 361/752 |
| 7,283,376 | B2 | 10/2007 | Han et al. | |
| 7,561,440 | B2 * | 7/2009 | Dai | H05K 7/1408 312/223.2 |
| 7,586,757 | B2 * | 9/2009 | Zhang | H05K 7/1408 361/801 |
| 7,826,211 | B2 * | 11/2010 | Liu | G06F 1/186 312/223.1 |
| 7,864,518 | B2 | 1/2011 | Wu et al. | |
| 8,373,981 | B2 * | 2/2013 | Zhang | G06F 1/186 361/679.31 |
| 2007/0206368 | A1 | 9/2007 | Zhang et al. | |
| 2007/0242442 | A1 * | 10/2007 | Dai | H05K 7/1408 361/801 |

(Continued)

FOREIGN PATENT DOCUMENTS

| CN | 2491874 Y | 5/2002 |
|---|---|---|
| CN | 2494521 Y | 6/2002 |

(Continued)

*Primary Examiner* — Robert J Hoffberg
*Assistant Examiner* — Hung Dang (57) ABSTRACT

The present invention discloses an apparatus for fastening an expansion card, which includes: a "[" shaped bracket, where a pair of guide rails is symmetrically disposed on two arts of the "[" shaped bracket and a pair of first connection parts is symmetrically formed, and a backplane is permanently connected to the bottom of the "[" shaped bracket, where at least one expansion card slot is disposed on the backplane; and a "]" shaped compression element for the expansion card, where a pair of sliding blocks is symmetrically formed on two arms of the "]" shaped compression element for the expansion card and a pair of second connection parts is symmetrically formed, where each sliding block is embedded in a guide rail and can be slid along the guide rail; The present invention improves convenience of assembly and maintenance of an expansion card.

9 Claims, 8 Drawing Sheets

(56) References Cited

U.S. PATENT DOCUMENTS

| | | |
|---|---|---|
| 2009/0129002 A1 | 5/2009 | Wu et al. |
| 2009/0154119 A1* | 6/2009 | Chen ............ H05K 7/1408 361/759 |
| 2011/0157820 A1* | 6/2011 | Yang ............ G06F 1/185 361/679.58 |
| 2011/0286182 A1 | 11/2011 | Zhang et al. |
| 2012/0014053 A1 | 1/2012 | Peng et al. |

FOREIGN PATENT DOCUMENTS

| | | |
|---|---|---|
| CN | 2857271 Y | 1/2007 |
| CN | 2874600 Y | 2/2007 |
| CN | 2886650 Y | 4/2007 |
| CN | 101055486 A | 10/2007 |
| CN | 102253694 A | 11/2011 |
| CN | 102662442 A | 9/2012 |
| DE | 20013161 | 11/2000 |

* cited by examiner

APPARATUS FOR FASTENING EXPANSION CARD

CROSS-REFERENCE TO RELATED APPLICATIONS

This application is a continuation of International Application No. PCT/CN2012/083758, filed on Dec. 3, 2012, which claims priority to Chinese Patent Application No. 201210075657.5, filed on Mar. 21, 2012, both of which are hereby incorporated by reference in their entireties.

TECHNICAL FIELD

Embodiments of the present invention relate to a computer technology, and in particular, to an apparatus for fastening an expansion card.

BACKGROUND

With the continuous deepening of network applications, a server that serves as a hub of data communications and transmission plays an increasingly important role. In addition, people have higher requirements for performance of the server. Therefore, an expansion card, as a necessary accessory for server configuration upgrade is applied to a server more widely.

Figure 1:
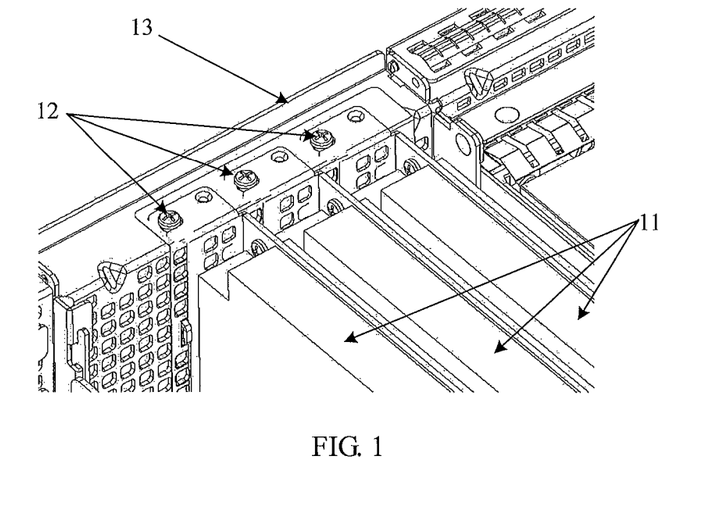
FIG. 1 is an example of fastening an expansion card by using a screw in the prior art.

An expansion card bracket 13 is generally and permanently connected to a fastener of a server chassis, for example, a chassis enclosure. After an expansion card 11 is inserted into an expansion card slot, in the prior art, the expansion card 11 is fastened on the expansion card bracket 13 by using a screw 12, as shown in FIG. 1, so that the expansion card is fastened to a specific position inside the server chassis. Because each expansion card needs to be installed and fastened to the expansion card bracket by using screws in the prior art, it takes a relatively long time for installation, which cannot meet application requirements of rapid disassembly, assembly and maintenance.

SUMMARY

Embodiments of the present invention provide an apparatus for fastening an expansion card to improve convenience of assembly and maintenance of an expansion card.

An embodiment of the present invention provides an apparatus for fastening an expansion card, including:

a "[" shaped bracket, where a pair of guide rails is symmetrically disposed on two arms of the "[" shaped bracket and a pair of first connection parts is symmetrically formed; and a backplane is permanently connected to the bottom of the "[" shaped bracket, where at least one expansion card slot is disposed on the backplane; and a "]" shaped compression element for the expansion card, where a pair of sliding blocks is symmetrically formed on two arms of the "]" shaped compression element for the expansion card and a pair of second connection parts is symmetrically formed; the bottom of the "]" shaped compression element for the expansion card horizontally extends to form at least one elastic slab, and a position of each elastic slab corresponds to a position of each expansion card slot;

each of the sliding blocks is embedded in one of the guide rails and can be slid along the guide rail; when in a state that the sliding block is located at a first end of the guide rail, a position of the second connection part corresponds to a position of the first connection part, the first connection portion and the second connection portion can be connected in a nested manner, and the elastic slab is pressed against the expansion card inserted into the expansion card slot to apply a pressing force that points to the backplane to the expansion card; and when in a state that the sliding block is located at a second end of the guide rail, the elastic slab and the expansion card are separate and do not overlap.

In an apparatus for fastening an expansion card provided by this embodiment of the present invention, guide rails are disposed on two arms of a "[" shaped bracket, and sliding blocks are symmetrically formed on the outer sides of two arms of a "]" shaped compression element for the expansion card. The sliding block is slid to different positions in the guide rail, so that an elastic slab horizontally extended by the bottom of the "]" shaped compression element for the expansion card presses the expansion card tightly or is loose from the expansion card. In this way, the expansion card and the bracket can be assembled without using any screw and the expansion card can be disassembled from the bracket without using any tool, thereby improving convenience of assembly and maintenance of the expansion card.

BRIEF DESCRIPTION OF THE DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and persons of ordinary skill in the art may still derive other drawings according to these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the embodiments to be described are a part rather than all of the embodiments of the present invention. All other embodiments obtained by persons of ordinary skill in the art based on the embodiments of the present invention without creative efforts shall fall within the protection scope of the present invention.

Figure 2:
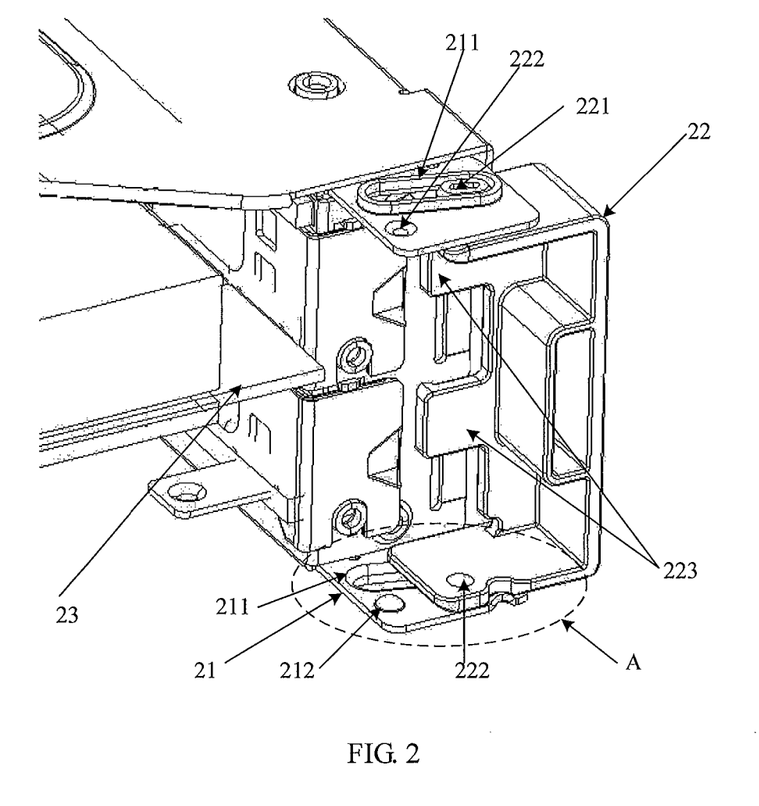
FIG. 2 is a schematic structural diagram of an apparatus for fastening an expansion card when an elastic slab is loose from an expansion card according to an embodiment of the present invention.

FIG. 2 is a schematic structural diagram of an apparatus for fastening an expansion card when an elastic slab is loose from an expansion card according to an embodiment of the present invention. The apparatus for fastening an expansion card shown in FIG. 2 includes a bracket and an expansion card pressing part, where the bracket has an outline similar to a "[" shape and is referred to as a "[" shaped bracket 21 in this embodiment of the present invention; and the expansion card compression element has an outline similar to a "]" shape and is referred to as a "]" shaped compression element 22 for the expansion card.

Figure 3:
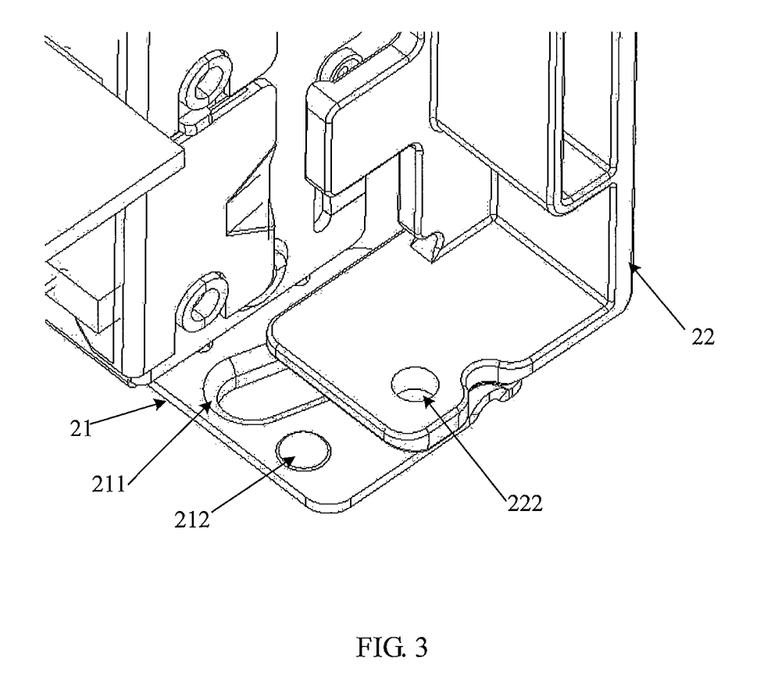
FIG. 3 is a schematic diagram of partial enlargement of part A in FIG. 2.

A pair of first connection parts is symmetrically formed on two arms of the "[" shaped bracket 21. A pair of second connection parts is symmetrically formed on the outer sides of two arms of the "]" shaped compression element 22 for the expansion card. The first connection part and the second connection part may be connected in a nested manner. Optionally, as shown in FIG. 3, the first connection part may be a convex block 212, and optionally, the convex block 212 may be circular; and the second connection part may be a through hole 222 that matches the convex block 212. For example, if the convex block 212 is circular, the through hole 222 is a circular convex through hole that matches the circular convex block. Alternatively, optionally, the second connection part may be a convex block, and the first connection part may be a through hole that matches the convex block.

A pair of guide rails 211 is also symmetrically disposed on the two arms of the "[" shaped bracket 21. A pair of sliding blocks 221 is also symmetrically formed on the outer sides of the two arms of the "]" shaped compression element 22 for the expansion card. The sliding block 221 can be embedded in the guide rail 211, and can be slid along the guide rail 211.

A backplane is permanently connected to the bottom of the "[" shaped bracket 21, where at least one expansion card slot is disposed on the backplane, and an expansion card 23 is inserted into the expansion card slot. The bottom of the "]" shaped compression element 22 for the expansion card horizontally extends to form at least one elastic slab 223, where a position of the elastic slab 223 corresponds to a position of the expansion card slot.

Figure 4:
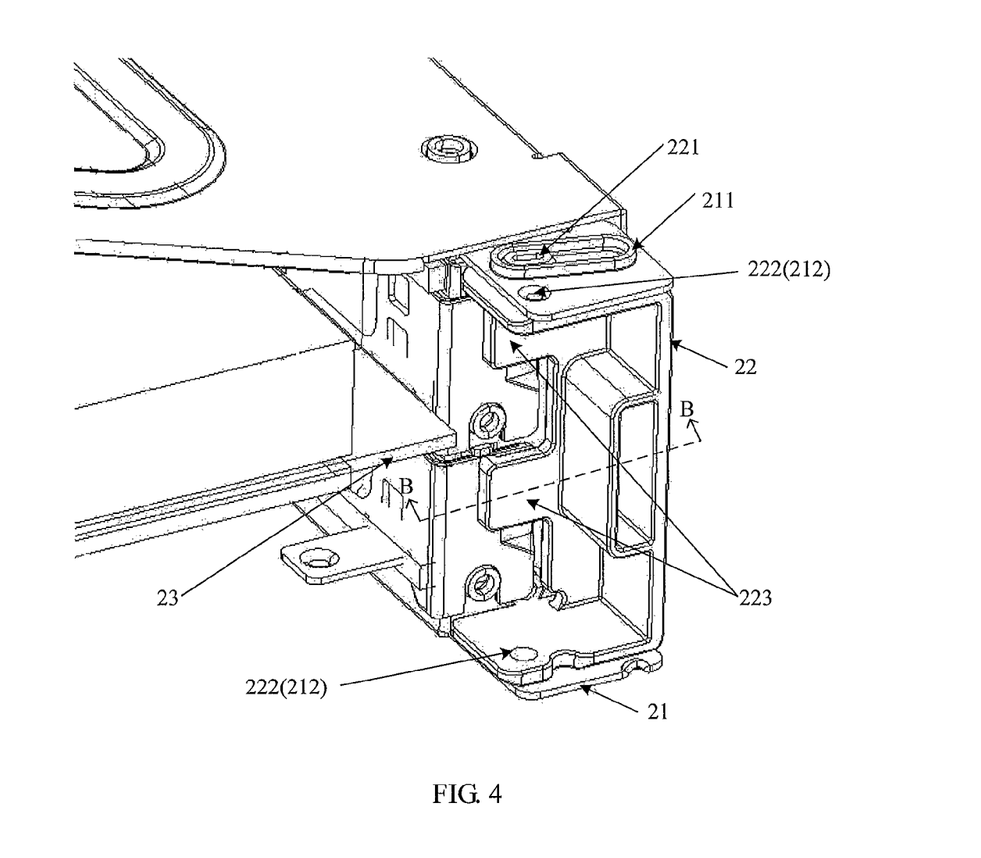
FIG. 4 is a schematic structural diagram of an apparatus for fastening an expansion card when an elastic slab presses an expansion card tightly according to an embodiment of the present invention.

The sliding block 221 can be slid along the guide rail 211. When in a state that the sliding block 221 is located at a first end of the guide rail 211, as shown in FIG. 4, the elastic slab 223 is pressed against the expansion card 23 inserted into the expansion card slot to apply a pressing force that points to the backplane to the expansion card 23 by using an elasticity of the elastic slab 23. In this case, the convex block 212 can be embedded in the through hole 222 to achieve a positioning effect, so that the sliding block 221 can remain in the state of locating at the first end of the guide rail 211. In this way, the expansion card is not easily released due to a received effective pressing force, thereby achieving a purpose of fastening the expansion card to the expansion card bracket without using any screw. When in a state that the sliding block 221 is located at a second end of the guide rail 211, as shown in FIG. 2, the elastic slab 223 and the expansion card 23 are separate and do not overlap. In this case, the expansion card 23 can be easily removed from the expansion card slot.

In an apparatus for fastening an expansion card provided by this embodiment of the present invention, guide rails are disposed on two arms of a "[" shaped bracket, and sliding blocks are symmetrically formed on the outer sides of two arms of a "]" shaped compression element for the expansion card. The sliding block can be slid to different positions in the guide rail, so that an elastic slab extended by the bottom of the "]" shaped compression element for the expansion card presses the expansion card tightly or is loose from the expansion card. In this way, the expansion card and the bracket can be assembled without using any screw and the expansion card can be disassembled from the bracket without using any tool, thereby improving convenience of assembly and maintenance of the expansion card.

The technical solution of the present invention is described by using an example that a pair of sliding blocks and a pair of second connection parts are located on the outer sides of the two arms of the "]" shaped compression element for the expansion card. It is understood that in another replaceable implementation manner, a pair of sliding blocks and a pair of second connection parts may also be located on the inner sides of the two arms of the "]" shaped compression element for the expansion card; the two arms of the "]" shaped compression element for the expansion card are wrapped on the outer sides of the two arms of the "[" shaped bracket, so that the sliding block is embedded in the guide rail and can be slid along the guide rail; and the second connection part and the first connection part can be connected in a nested manner.

Figure 5:
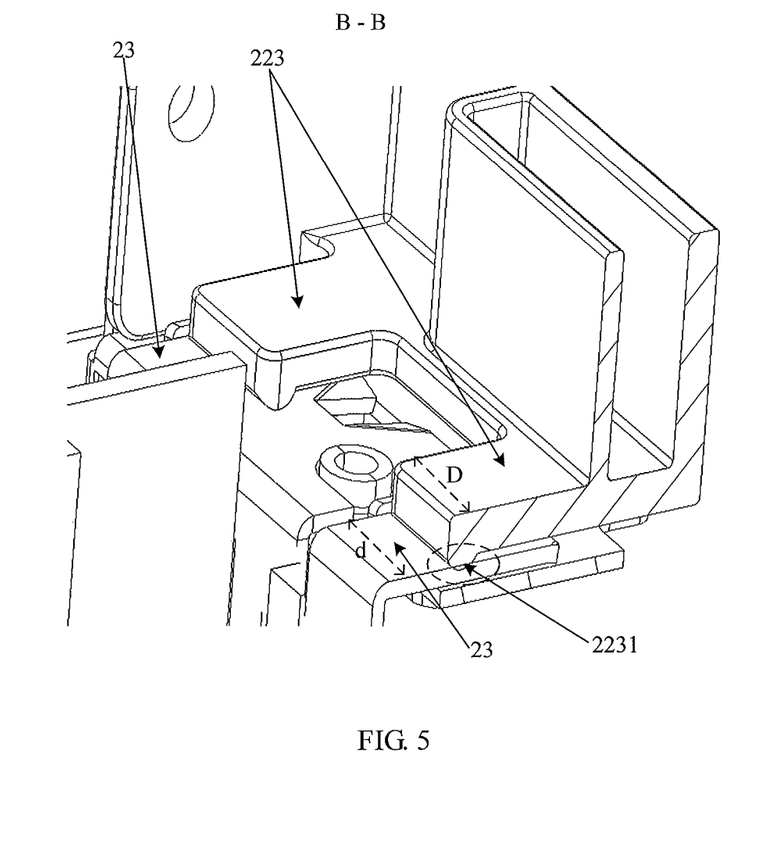
FIG. 5 is a schematic sectional diagram of a B-B side in FIG. 4.

In the foregoing technical solution, optionally, a width D of the elastic slab 223 may be the same as a width d of the expansion card 23, as shown in FIG. 5. Further, a pair of wing angles 2231 is formed on two sides of the elastic slab 223. When the elastic slab 223 is pressed against the expansion card 23, the elastic slab 223 may tightly hold two sides of the expansion card 23 by using this pair of wing angles 2231, that is, when the elastic slab 223 is pressed against the expansion card 23, the elastic slab 223 applies a holding force to the expansion card 23 by using this pair of wing angles 2231, to control the expansion card 23 not to move along directions of two sides of the expansion card 23, which improves a fastening effect of the expansion card 23.

Figure 6:
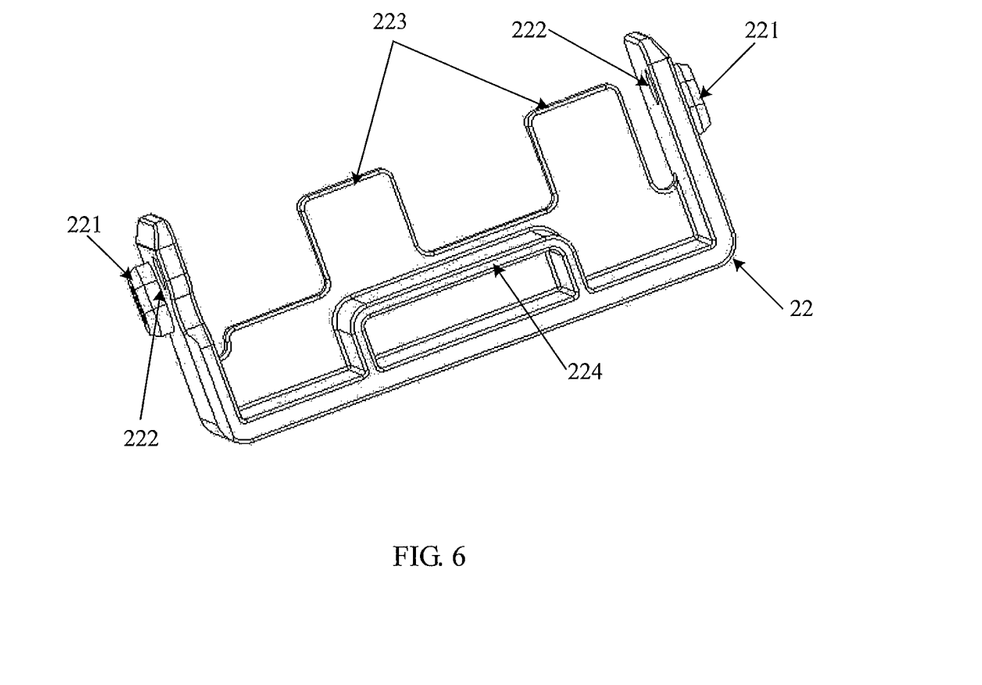
FIG. 6 is a schematic structural diagram of a "]" shaped compression element for the expansion card according to an embodiment of the present invention.
Figure 7:
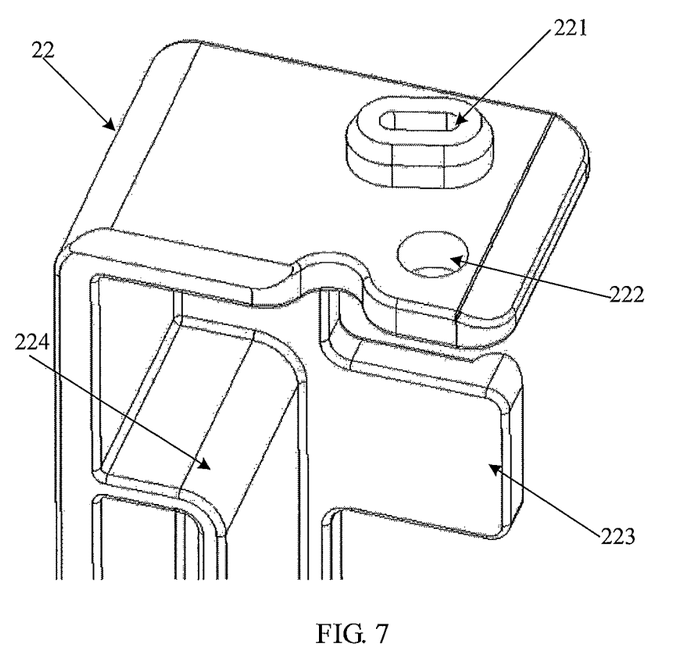
FIG. 7 is a schematic structural diagram of a sliding block in FIG. 6.

In the foregoing technical solution, optionally, the guide rail 211 may be a kidney-shaped guide rail, and the sliding block 221 is a kidney-shaped sliding block that matches the kidney-shaped guide rail, where both ends of the kidney shape is an arc and the middle of the kidney shape is a straight edge, specifically as shown in FIG. 6 and FIG. 7. Such a processing manner can effectively avoid a phenomenon that when the sliding block 221 slides along the guide rail 221, the "]" shaped compression element for the expansion card rotates by itself.

In addition, it should be noted that the shapes of the guiding rail and the sliding block are not limited to the kidney shape and those skilled in the art can set other shapes according to a requirement.

Optionally, a quantity of elastic slabs 223 can be determined according to a quantity of expansion slots disposed on the backplane; and when in the state that the sliding block 221 is located at the first end of the guiding rail 211, positions of elastic slabs 223 correspond to positions of expansion slots, and each elastic slab is configured to tightly press an expansion card inserted into an expansion slot. The elastic slab 223 can apply a pressing force that points to the backplane to the expansion card by using an elasticity of a material of the elastic slab 223. Optionally, an elastic slab reinforcement block 224 may be formed in a direction opposite to a position where the elastic slab 223 is pressed against the expansion card 23. As shown in FIG. 7, the elastic slab reinforcement block 224 is permanently connected to the bottom of the "]" shaped compression element 22 for the expansion card, and is configured to increase an overall strength of the "]" shaped compression element for the expansion card, so that the elastic slab 223 can apply an effective pressing force to a corresponding expansion card to prevent the expansion card from releasing from the expansion card slot.

Optionally, the "]" shaped compression element 22 for the expansion card, the sliding block 221, the through hole 222, the elastic slab 223, and the elastic slab reinforcement block 224 may be integrally molded by using plastic injection to improve convenience of processing of the expansion card compression element and an overall elasticity of the expansion card compression element and reduce manufacturing costs.

Figure 8:
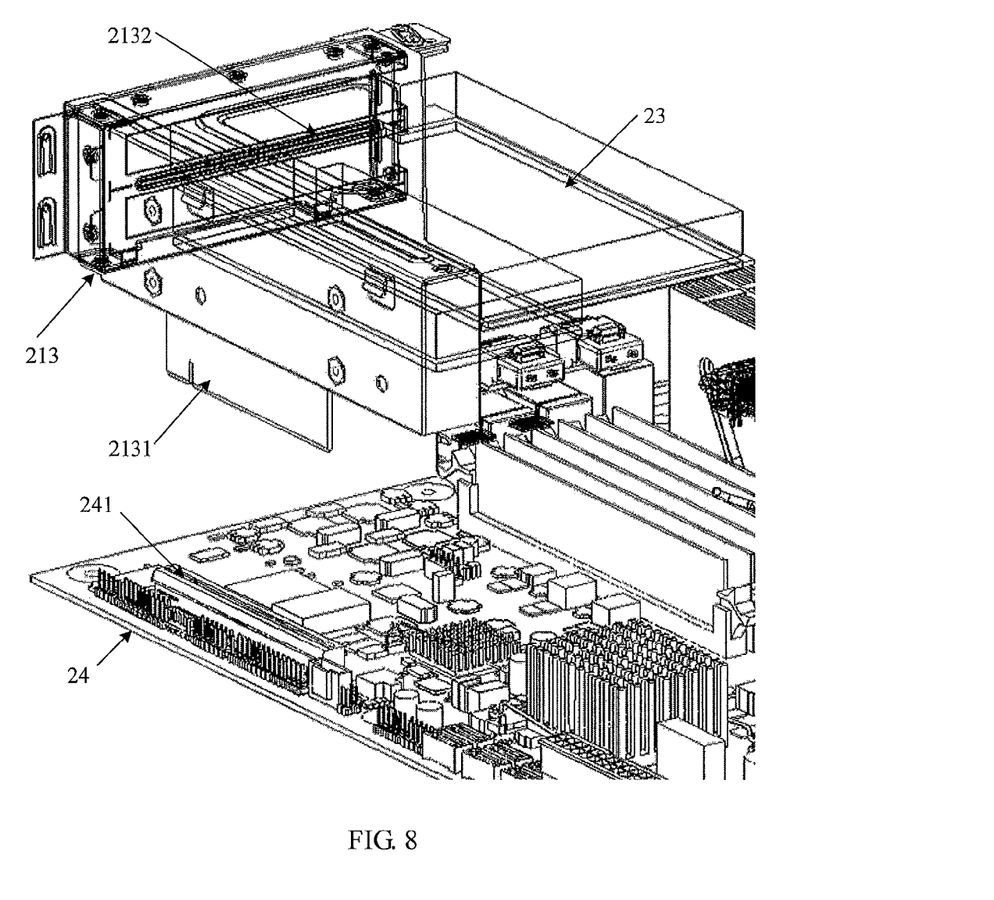
FIG. 8 is an example of layout of an expansion card slot and a backplane plug-in card on a backplane according to an embodiment of the present invention.

In the foregoing technical solution, optionally, as shown in FIG. 8, a backplane plug-in card 2131 may be disposed in a vertical direction of the backplane 213, where the backplane plug-in card 2131 is configured to insert, in a direction perpendicular to a mainboard 24, into a backplane slot 241 disposed on the mainboard 24. A quantity of expansion card slots 2132 disposed on the backplane 213 may be one or more. Each expansion card slot 2132 is disposed in a horizontal direction of the backplane, and the expansion card 23 is inserted into the expansion card slot 2132 in a direction parallel with the mainboard 24. Because each expansion card 23 is inserted into the expansion card slot 2132 in the direction parallel with the mainboard 24, a vertical space inside the chassis can be effectively reduced, thereby increasing utilization of the space inside the chassis.

With reference to the foregoing FIG. 2 to FIG. 8, an optional example of assembling an expansion card by using the apparatus for fastening an expansion card provided in this embodiment of the present invention is, for example, as follows: First, a sliding block 221 is slid to a second end of a guide rail 211, and expansion cards 23 are separately inserted into expansion card slots 2132 in a direction parallel with the mainboard 24. The sliding block 221 is slid to a first end of the guide rail 211, and the convex block 212 is embedded in the through hole 222, so that the sliding block 221 is maintained at the first end of the guide rail 211. Meanwhile, the elastic slab 223 is pressed against the expansion card 23, to apply the pressing force that points to the backplane to the expansion card 23 by using the elasticity of the material of the elastic slab 23. In this case, an expansion card module with the expansion cards fastened can be obtained. Then, the backplane plug-in card 2131 is inserted, in a direction vertical to the mainboard 24, into the backplane slot 241 disposed on the mainboard. The bracket may be permanently connected to a certain fastener of the chassis, for example, a chassis enclosure. In this way, assembly of the expansion card module is completed. When any one expansion card needs to be removed from the expansion card module or an expansion card needs to be added to the expansion card module, the convex block 212 can be removed from the through hole 222, and the sliding block 221 is slid to the second end of the guide rail, so that the elastic slab 223 and the expansion card 23 are separate and do not overlap. In this case, the expansion card can be conveniently removed or inserted.

It can be learned from the foregoing example of the assembly and disassembly process that the apparatus for fastening an expansion card provided by this embodiment of the present invention has a simple structure. Guide rails are disposed on two arms of a "[" shaped bracket, and sliding blocks are symmetrically formed on the outer sides of two arms of a "]" shaped compression element for the expansion card. The sliding block is slid to different positions in the guide rail, so that an elastic slab extended by the bottom of the "]" shaped compression element for the expansion card presses the expansion card tightly or is loose from the expansion card. In this way, the expansion card and the bracket can be assembled without using any screw and the expansion card can be disassembled from the bracket without using any tool, thereby improving convenience of assembly and maintenance of the expansion card. In addition, because each expansion card is inserted into an expansion card slot in a direction parallel with a mainboard, a vertical space inside the chassis can be reduced effectively, thereby increasing utilization of the space inside the chassis.

The apparatus for fastening an expansion card provided by the embodiments of the present invention can be used for fastening an expansion card in a computer, a server, and other network devices except the server. The expansion card may include, but is not limited to, a peripheral component interconnection (Peripheral Component Interconnection, PCI for short) expansion card, a PIC express PCI (PCI Express, PCI-E for short) expansion card, and the like.

In the foregoing embodiments, each embodiment is described with a different emphasis. For details about parts not detailed in one embodiment, reference may be made to the related description in other embodiments.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to part of the technical features in the technical solutions; however, these modifications or replacements do not make the essence of corresponding technical solutions depart from the spirit and scope of the technical solutions of the embodiments of the present invention.

What is claimed is:

1. An apparatus for fastening an expansion card, the apparatus comprising:
   a "[" shaped bracket, wherein a pair of guide rails is symmetrically disposed on two arms of the "[" shaped bracket and a pair of first connection parts is symmetrically formed on the two arms of the "[" shaped bracket, and a backplane is permanently connected to the bottom of the "[" shaped bracket, wherein at least one expansion card slot is disposed on the backplane;
   a "]" shaped compression element, wherein a pair of sliding blocks is symmetrically formed on two arms of the "]" shaped compression element and a pair of second connection parts is symmetrically formed on the two arms of the "]" shaped compression element, and the bottom of the "]" shaped compression element horizontally extends to form at least one elastic slab, and a position of the elastic slab corresponds to a position of the expansion card slot;
   wherein each of the sliding blocks is embedded in one of the guide rails and can be slid along the guide rail; when in a state that the sliding block is located at a first end of the guide rail, a position of the second connection part corresponds to a position of the first connection part, the second connection part and the first connection part are connected in a nested manner, and the elastic slab is pressed against the expansion card to apply a pressing force to the expansion card in a direction of the backplane when the expansion card is inserted into the expansion card slot; and when in a state that the sliding block is located at a second end of the guide rail, the elastic slab and the expansion card are separate and do not overlap.

2. The apparatus according to claim 1, wherein:
the pair of sliding blocks and the pair of second connection parts are located on the outer sides of the two arms of the "]" shaped compression element; or
the pair of sliding blocks and the pair of second connection parts are located on the inner sides of the two arms of the "]" shaped compression element.

3. The apparatus according to claim 1, wherein:
the first connection part is a convex block, and the second connection part is a through hole that matches the convex block; or
the second connection part is a convex block, and the first connection part is a through hole that matches the convex block.

4. The apparatus according to claim 1, wherein the guide rail is a kidney-shaped guide rail and the sliding block is a kidney-shaped sliding block that matches the kidney-shaped guide rail.

5. The apparatus according to claim 1, wherein an elastic slab reinforcement block is further formed in a direction opposite to a position where the elastic slab is pressed against the expansion card, wherein the elastic slab reinforcement block is permanently connected to the bottom of the "]" shaped compression element.

6. The apparatus according to claim 5, wherein the "]" shaped compression element, the second connection part, the sliding block, the elastic slab, and the elastic slab reinforcement block are integrally molded by using plastic injection.

7. The apparatus according to claim 1, wherein a width of the elastic slab is equal to a width of the expansion card.

8. The apparatus according to claim 7, wherein a pair of wing angles is formed on two sides of the elastic slab and configured to apply a holding force to the expansion card when the elastic slab is pressed against the expansion card.

9. The apparatus according to claim 1, wherein:
a backplane plug-in card is disposed in a vertical direction of the backplane and is configured to insert, in a direction perpendicular to a mainboard, into a backplane slot disposed on the mainboard; and
the expansion card slot is horizontally disposed along the backplane, so that the expansion card can be inserted in a direction parallel with the mainboard.

* * * * *